US010914302B2

(12) United States Patent
Beisel

(10) Patent No.: US 10,914,302 B2
(45) Date of Patent: Feb. 9, 2021

(54) SINGLE-SENSOR ANALYSIS SYSTEM

(71) Applicant: Halliburton Energy Services, Inc., Houston, TX (US)

(72) Inventor: Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 401 days.

(21) Appl. No.: 15/745,597

(22) PCT Filed: Sep. 4, 2015

(86) PCT No.: PCT/US2015/048673
§ 371 (c)(1),
(2) Date: Jan. 17, 2018

(87) PCT Pub. No.: WO2017/039700
PCT Pub. Date: Mar. 9, 2017

(65) Prior Publication Data
US 2018/0216613 A1  Aug. 2, 2018

(51) Int. Cl.
*F04B 49/06* (2006.01)
*F04B 49/00* (2006.01)
(Continued)

(52) U.S. Cl.
CPC ............ *F04B 49/065* (2013.01); *F04B 23/06* (2013.01); *F04B 47/02* (2013.01); *F04B 49/00* (2013.01);
(Continued)

(58) Field of Classification Search
CPC ........ F04B 49/065; F04B 47/02; F04B 53/00; F04B 49/00; F04B 49/002; F04B 23/06; G01L 19/00; G01L 19/0007
See application file for complete search history.

(56) References Cited

U.S. PATENT DOCUMENTS 3,921,435 A   11/1975  Howard
4,333,424 A    6/1982  McFee
(Continued)

FOREIGN PATENT DOCUMENTS

WO    2011095935    8/2011
WO    2017039692    3/2017
(Continued)

OTHER PUBLICATIONS

International Patent Application No. PCT/US2015/048588, "International Search Report and Written Opinion", dated May 4, 2016, 8 pages.
(Continued)

Primary Examiner — Regis J Betsch
Assistant Examiner — Jeremy A Delozier
(74) Attorney, Agent, or Firm — Kilpatrick Townsend & Stockton LLP

(57) ABSTRACT

An analysis system may determine a discharge pressure or a suction pressure using a single measurement sensor coupled to a computing device. The measurement sensor may include a pressure sensor or a strain sensor. In some aspects, the pressure sensor may generate a pressure signal representing the total pressure in a chamber of the pressure pump. The computing device may apply an envelope filter to the pressure signal to determine the discharge or suction pressure in the chamber from the pressure signal. In other aspects, the strain sensor may generate a strain signal representing the strain in the chamber. The computing device may determine the discharge or suction portions of the strain signal and may correlate the portions with a predetermined internal pressure for the pressure pump to determine the discharge or suction pressure in the chamber.

16 Claims, 14 Drawing Sheets

(51) Int. Cl.
*F04B 53/10* (2006.01)
*G01L 19/00* (2006.01)
*F04B 23/06* (2006.01)
*F04B 53/00* (2006.01)
*F04B 47/02* (2006.01)

(52) U.S. Cl.
CPC ............ *F04B 49/002* (2013.01); *F04B 53/00* (2013.01); *F04B 53/10* (2013.01); *G01L 19/00* (2013.01); *G01L 19/0007* (2013.01); *F04B 2201/0601* (2013.01); *F04B 2205/03* (2013.01)

(56) References Cited

U.S. PATENT DOCUMENTS

| | | | |
|---|---|---|---|
| 4,705,459 A | 11/1987 | Buisine et al. | |
| RE33,649 E | 7/1991 | Kawai | |
| 5,846,056 A * | 12/1998 | Dhindsa | F04B 23/06 417/44.2 |
| 6,155,347 A | 12/2000 | Mills | |
| 6,859,740 B2 | 2/2005 | Stephenson et al. | |
| 6,882,960 B2 | 4/2005 | Miller | |
| 7,043,975 B2 | 5/2006 | Du | |
| 7,623,986 B2 | 11/2009 | Miller | |
| 8,807,960 B2 | 8/2014 | Stephenson et al. | |
| 9,759,213 B2 | 9/2017 | Bassett et al. | |
| 10,480,296 B2 | 11/2019 | Beisel | |
| 10,564,020 B2 | 2/2020 | Beisel | |
| 2002/0007952 A1 | 1/2002 | Vann | |
| 2002/0176784 A1 | 11/2002 | Du | |
| 2004/0018100 A1 | 1/2004 | Takagi et al. | |
| 2004/0144529 A1 | 7/2004 | Barnes et al. | |
| 2004/0158419 A1 | 8/2004 | Pearson et al. | |
| 2005/0180868 A1 | 8/2005 | Miller | |
| 2006/0037408 A1 | 2/2006 | Peter | |
| 2007/0041849 A1 | 2/2007 | Allen | |
| 2007/0139211 A1 | 6/2007 | Pessin et al. | |
| 2007/0140869 A1 * | 6/2007 | St. Michel | E21B 47/0008 417/53 |
| 2008/0260558 A1 | 10/2008 | Luongo et al. | |
| 2009/0041588 A1 | 2/2009 | Hunter et al. | |
| 2009/0129935 A1 | 5/2009 | Kunkler et al. | |
| 2009/0317262 A1 | 12/2009 | Gilpatrick | |
| 2010/0300683 A1 | 12/2010 | Looper et al. | |
| 2011/0046903 A1 | 2/2011 | Franklin | |
| 2012/0144995 A1 | 6/2012 | Bayyouk et al. | |
| 2013/0151216 A1 | 6/2013 | Palka et al. | |
| 2013/0261993 A1 | 10/2013 | Ruchti et al. | |
| 2014/0096957 A1 | 4/2014 | Van Zuilekom et al. | |
| 2014/0166267 A1 * | 6/2014 | Weightman | E21B 47/06 166/250.01 |
| 2014/0288858 A1 | 9/2014 | Franklin | |
| 2015/0027693 A1 | 1/2015 | Edwards et al. | |
| 2016/0305419 A1 | 10/2016 | Liu et al. | |
| 2017/0138645 A1 * | 5/2017 | Sakima | F25B 45/00 |
| 2018/0223644 A1 * | 8/2018 | Beisel | E21B 47/009 |

FOREIGN PATENT DOCUMENTS

| | | |
|---|---|---|
| WO | 2017039695 | 3/2017 |
| WO | 2017039698 | 3/2017 |
| WO | 2017039701 | 3/2017 |

OTHER PUBLICATIONS

International Patent Application No. PCT/US2015/048610, "International Search Report and Written Opinion", dated May 4, 2016, 9 pages.
International Patent Application No. PCT/US2015/048647, "International Search Report and Written Opinion", dated May 4, 2016, 8 pages.
International Patent Application No. PCT/US2015/048673, "International Search Report and Written Opinion", dated Jun. 3, 2016, 15 pages.
International Patent Application No. PCT/US2015/048696, "International Search Report and Written Opinion", dated May 4, 2016, 8 pages.
U.S. Appl. No. 15/743,178, "Non-Final Office Action", dated Feb. 5, 2020, 28 pages.
U.S. Appl. No. 15/743,405, "Notice of Allowance", dated Oct. 30, 2019, 9 pages.
U.S. Appl. No. 15/743,572, "Non-Final Office Action", dated Apr. 6, 2020, 21 pages.
U.S. Appl. No. 15/745,644, "Notice of Allowance", dated Jul. 10, 2019, 8 pages.
CA2,991,701, "Office Action", dated Jul. 22, 2019, 3 pages.
CA2,991,701, "Office Action", dated Nov. 6, 2018, 3 pages.

* cited by examiner

SINGLE-SENSOR ANALYSIS SYSTEM

TECHNICAL FIELD

The present disclosure relates generally to pressure pumps for a wellbore and, more particularly (although not necessarily exclusively), to systems and methods for determining suction pressure or discharge pressure in a chamber of a pressure pump.

BACKGROUND

Pressure pumps may be used in wellbore environments for a variety of purposes. For example, hydraulic fracturing (also known as "fracking" or "hydro-fracking") may utilize pressure pumps to introduce or inject fluid at high pressures into a wellbore to create cracks or fractures in downhole rock formations. Due to the high-pressured and high-stressed nature of the fracturing environment, pressure pump parts may undergo mechanical wear and require frequent replacement. The pressure within the pressure pump may be determined for monitoring the condition and wear of the pressure pump parts during operation of the pressure pump.

DETAILED DESCRIPTION

Figure 1A:
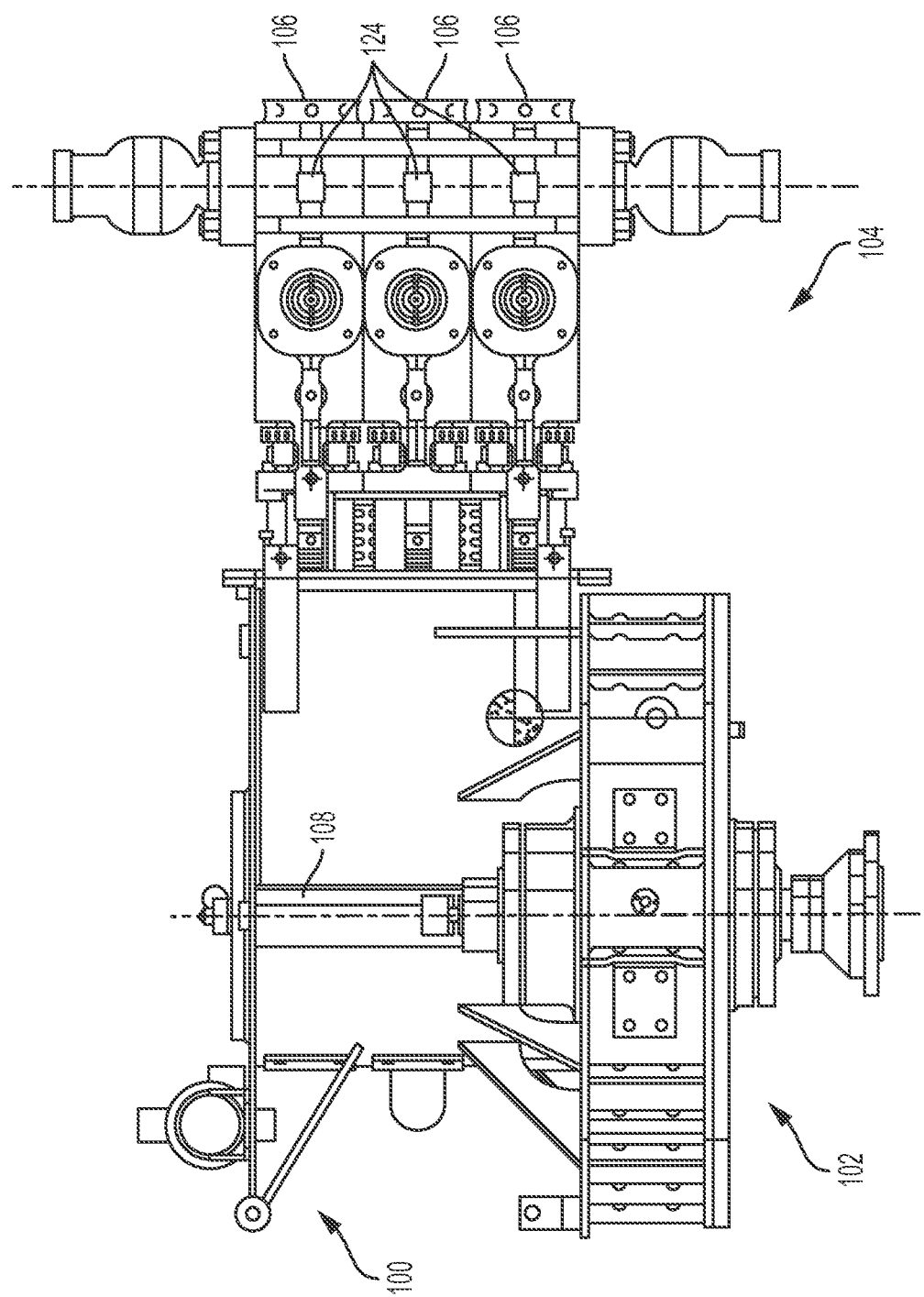
FIG. 1A is a cross-sectional, top view schematic diagram depicting an example of a pressure pump that may include an analysis system according to one aspect of the present disclosure.

Certain aspects and examples of the present disclosure relate to an analysis system for analyzing pressure in a fluid end of a pressure pump using a single measurement sensor. The pressure pump may be in fluid communication with an environment of a wellbore. The pressure pump may include a chamber on a fluid end of the pressure pump for receiving and discharging fluid for injecting the fluid into the wellbore. A suction valve in the chamber may be actuated to open and close to allow fluid to enter the chamber. A discharge valve in the chamber may be actuated to open and close to allow fluid to exit the chamber. As fluid is received and discharged from the chamber, pressure and strain in the fluid end may fluctuate. The pressure in the fluid end may include suction pressure corresponding to pressure caused by the opening and closing of the suction valve and discharge pressure corresponding to pressure caused by the opening and closing of the discharge valve. An analysis system according to some aspects may include a measurement sensor positioned in communication with the fluid end of the pressure pump to determine the discharge pressure and the suction pressure in the fluid end of the pressure pump.

In some aspects, an analysis system may include a single measurement sensor to measure the total pressure in a chamber of the pressure pump. A single measurement sensor positioned in communication with both a suction side and a discharge side of the fluid end may allow the suction pressure and the discharge pressure in the chamber to be determined without requiring separate sensors to be applied to each of the suction side and the discharge side of the fluid end. The use of a single measurement sensor instead of two measurement sensors may lead to cost savings by reducing the number of costly sensors required to analyze the fluid end pressure. Further, the high-pressure environment of the pressure pump may require frequent inspection or replacement of the sensors due to potential malfunctioning of or damage to the sensors. The reduction in sensors may lead to additional cost-savings in replacement costs and inspection time.

In some aspects, the measurement sensor of the analysis system may include a pressure sensor. The pressure sensor may measure a parameter of the chamber and transmit a signal representing the parameter of the chamber to a computing device of an analysis system. The analysis system according to some aspects may perform signal-processing algorithms to determine the suction pressure or the discharge pressure in the fluid end. For example, a computing device of the analysis system may receive the pressure signal from the pressure sensor and apply an envelope filter to the pressure signal. In some aspects, the envelope filter may be a high-enveloping filter that may generate a discharge pressure reading from the pressure signal. In other aspects, the envelope filter may be a low-enveloping filter that may generate a suction pressure reading from the pressure signal.

In other aspects, the measurement sensor of the analysis system may include a strain sensor. A computing device of the analysis system may receive the strain signal from the strain sensor and determine a suction portion or a discharge portion of the strain signal. In some aspects, the suction portion and the discharge portions of the strain signal may be determined by identifying actuation points corresponding to the opening and closing of the suction valve and discharge valve of the chamber, respectively. The computing device may correlate the suction portion or the discharge portion of the strain signal with a predetermined internal pressure corresponding to the pressure pump to determine the suction pressure or discharge pressure in the chamber.

An analysis system according to some aspects may allow the performance of the chamber to be determined without breaching the external surface of the pressure pump. For example, a strain sensor may be positioned on the external surface of the fluid end of the pressure pump to measure and generate signals corresponding to the strain in the chamber. In this manner, an additional stress concentration is not added to the pressure pump in the form of a hole or other breach of the pressure pump to access an interior of the fluid end. Eliminating or not including additional stress concentration caused by a breach of the pressure pump may extend the fatigue life of the pressure pump.

Figure 1B:
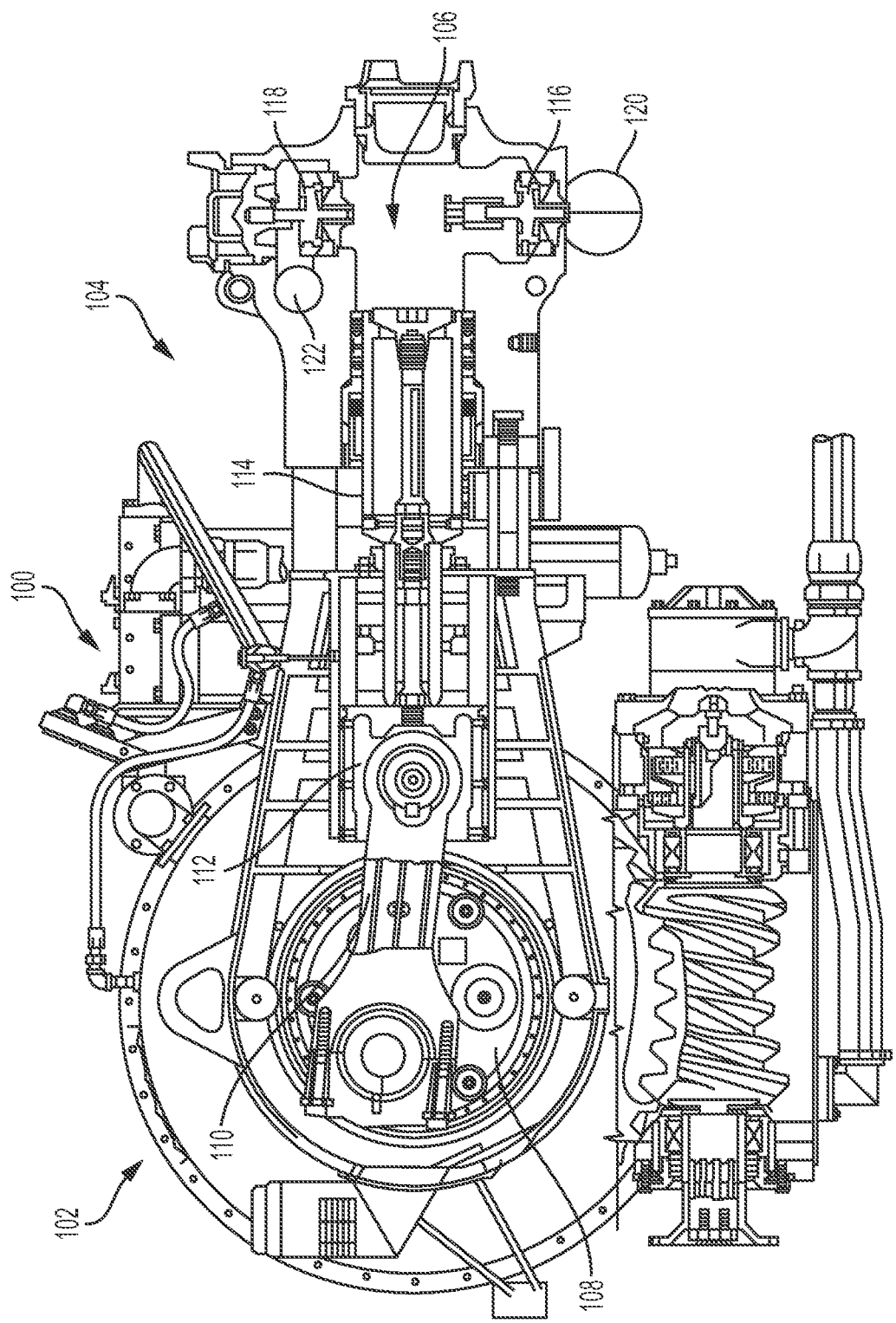
FIG. 1B is a cross-sectional, side view schematic diagram depicting the pressure pump of FIG. 1A according to one aspect of the present disclosure.

FIGS. 1A and 1B show a pressure pump 100 that may utilize an analysis system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes chambers 106 for receiving and discharging fluid flowing through the pressure pump 100. Although FIG. 1A shows three chambers 106 in the pressure pump 100, the pressure pump 100 may include any number of chambers 106, including one, without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc.). The crankshaft 108 may be positioned on the power end 102 of the pressure pump 100 and may be mechanically connected to a plunger 114 in a chamber 106 of the pressure pump via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the chamber 106. Based on the mechanical coupling of the crankshaft 108 to the plunger 114 in the chamber 106, the movement of the plunger 114 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in the chamber 106, the plunger 114 may impart motion and pressure to the fluid by direct displacement. The suction valve 116 and the discharge valve 118 may open and close based on the displacement of the fluid in the chamber 106 by the operation of the plunger 114. For example, the suction valve 116 may be opened during a recession of the plunger 114 to provide absorption of fluid from outside of the chamber 106 into the chamber 106. As the plunger 114 is withdrawn from the chamber 106, a partial suction may be created to open the suction valve 116 to allow fluid to enter the chamber 106. In some aspects, the fluid may be absorbed into the chamber 106 from an inlet manifold 120. Fluid already in the chamber 106 may move to fill the space where the plunger 114 was located in the chamber 106. The discharge valve 118 may be closed during this process.

The discharge valve 118 may be opened as the plunger 114 moves forward, or reenters, the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. In some aspects, the discharge valve 118 may discharge the fluid into a discharge manifold 122. The loss of pressure inside the chamber 106 may allow the discharge valve 118 to close and the cycle may restart. Together, the suction valve 116 and the discharge valve 118 may operate to provide the fluid flow in a desired direction. The process may include a measurable amount of pressure and stress in the chamber 106, the stress resulting in strain to the chamber 106 or fluid end 104 of the pressure pump 100.

In some aspects, an analysis system may be coupled to the pressure pump 100 to gauge the pressure or strain and determine suction pressure or discharge pressure in the chamber 106. For example, an analysis system may include a single measurement sensor positioned on an external surface of the fluid end 104 to measure a parameter in a chamber 106 of the pressure pump 100 (e.g., pressure, strain). In some aspects, the analysis system may include a single measurement sensor for each chamber 106 of the pressure pump. Block 124 in FIG. 1A show an example placement for a single measurement sensor on each of the three chambers 106 of the pressure pump 100.

Figure 2:
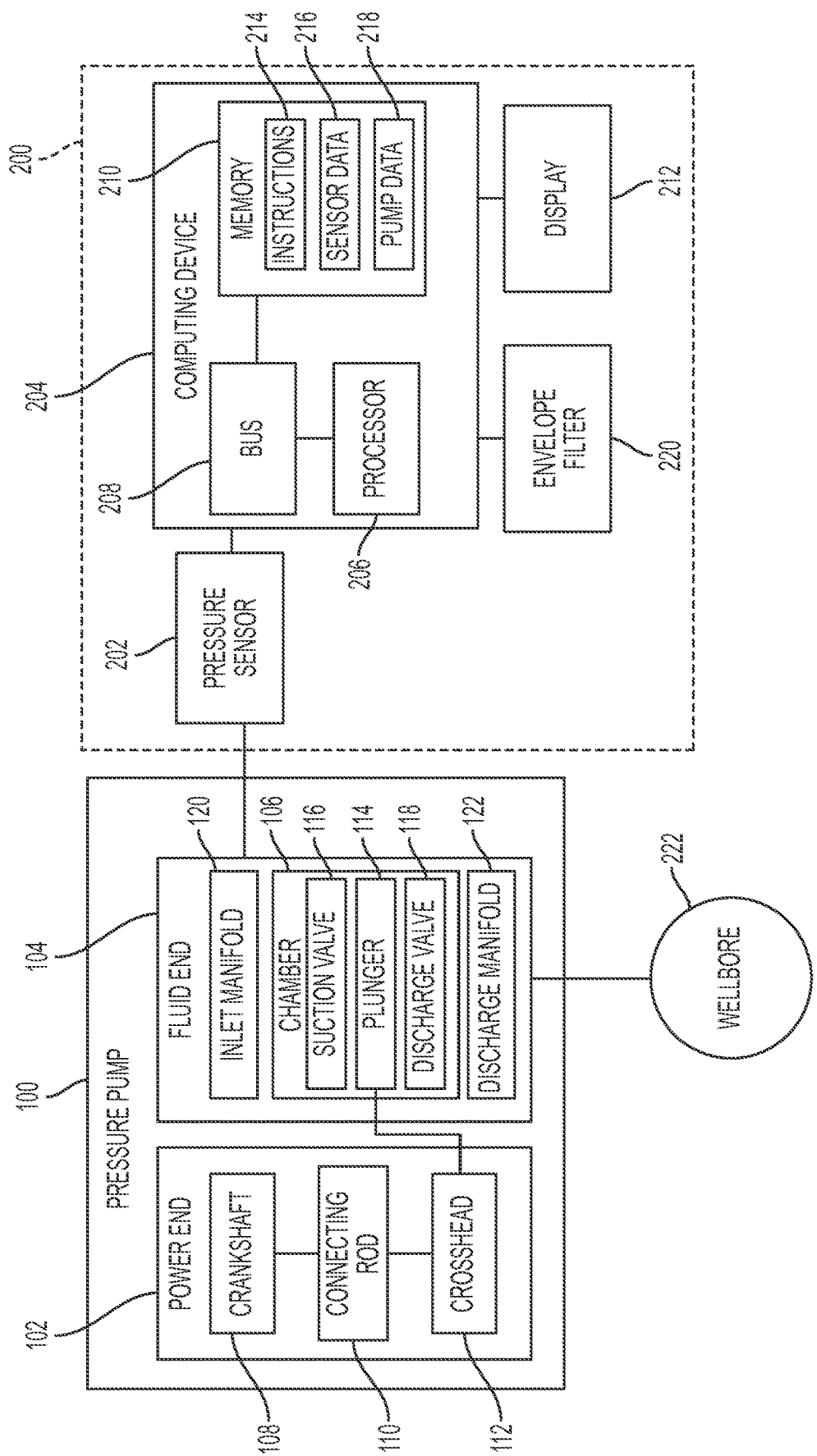
FIG. 2 is a block diagram depicting an analysis system for a pressure pump including a pressure sensor according to one aspect of the present disclosure.

FIG. 2 is a simple block diagram showing an example of an analysis system 200 coupled to the pressure pump 100. The analysis system 200 may include a single measurement sensor coupled to the fluid end 104 of the pressure pump 100 for generating a signal corresponding to a parameter in a chamber 106 of the pressure pump 100. In FIG. 2, the measurement sensor may include a pressure sensor 202. The pressure sensor 202 may be positioned on the fluid end 104 of the pressure pump 100. The pressure sensor 202 may be a pressure gauge, a pressure transducer, or other sensor for measuring the pressure in a chamber 106 of the pressure pump. In some aspects, the analysis system 200 may include a single pressure sensor 202 for the pressure pump 100. In other aspects, the analysis system 200 may include a pressure sensor 202 for each chamber 106 of the pressure pump 100. In some aspects, the pressure sensor 202 may be positioned on the fluid end 104 of the pressure pump 100 in a position having communication with both the suction side (corresponding to the suction valves 116 of the pressure pump) and the discharge side (corresponding to the discharge valves 118 of the pressure pump). In some aspects, the position may be determined using engineering estimations, finite element analysis, or by some other analysis to determine an appropriate position for pressure sensor 202 on the fluid end 104. The position of the pressure sensor 202 may allow the pressure sensor 202 to measure the total internal pressure in a chamber 106 during operation of the pressure pump 100. The total internal pressure may include a suction pressure associated with pressure in the chamber 106 for operation of the suction valve 116 and a discharge pressure associated with pressure the chamber 106 for operation of the discharge valve 118. The pressure sensor 202 may generate a pressure signal representing the total internal pressure in the chamber 106.

The analysis system 200 may also include a computing device 204. The computing device may be coupled to the pressure sensor 202 to receive pressure signals from the pressure sensor 202. The computing device 204 may include a processor 206, a bus 208, and a memory 210. In some aspects, the analysis system 200 may also include a display unit 212. The processor 206 may execute instructions 214 including one or more signal-processing operations for determining the suction pressure and the discharge pressure in a chamber 106 of the pressure pump 100. The instructions 214 may be stored in the memory 210 coupled to the processor 206 by the bus 208 to allow the processor 206 to perform the operations. The processor 206 may include one processing device or multiple processing devices. Non-limiting examples of the processor 206 may include a Field-Programmable Gate Array ("FPGA"), an application-specific integrated circuit ("ASIC"), a microprocessor, etc.

The non-volatile memory 210 may include any type of memory device that retains stored information when powered off. Non-limiting examples of the memory 210 may include electrically erasable and programmable read-only memory ("EEPROM"), a flash memory, or any other type of non-volatile memory. In some examples, at least some of the memory 210 may include a medium from which the processor 206 can read the instructions 214. A computer-readable medium may include electronic, optical, magnetic or other storage devices capable of providing the processor 206 with computer-readable instructions or other program code (e.g., instructions 214). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 214. The instructions 214 may include processor-specific instructions generated by a compiler or an interpreter from code written in any suitable computer-programming language, including, for example, C, C++, C#, etc.

In some examples, the computing device 204 may determine an input for the instructions 214 based on sensor data 216 from the measurement sensor of the analysis system 200, data input into the computing device 204 by an operator, or other input means. For example, the pressure sensor 202 may measure a parameter associated with the pressure pump 100 and transmit associated signals to the computing device 204. The computing device 204 may receive the signals, extract data from the signals, and store the sensor data 216 in memory 210. In additional aspects, the computing device 204 may determine an input for the instructions 214 based on pump data 218 stored in the memory 210 in response to previous determinations by the computing device 204, testing or experimentation performed by an operator or technician, or some other input. For example, the processor 206 may execute instructions 214 for correlating a signal received from the measurement sensor with internal pressure values for the pressure pump 100 previously determined by testing (e.g., finite element analysis) and previously stored as pump data 218 in the memory 210.

In some aspects, the computing device 204 may generate graphical interfaces associated with the sensor data 216, pump data 218, or information generated by the processor 206 therefrom to be displayed via a display unit 212. The display unit 212 may be coupled to the processor 206 and may include any CRT, LCD, OLED, or other device for displaying interfaces generated by the processor 206. In some aspects, the computing device 204 may also generate an alert or other communication of the performance of the pressure pump 100 based on determinations by the computing device 204 in addition to the graphical interfaces. For example, the display unit 212 may include audio components to emit an audible signal when suction pressure or discharge pressure in a chamber 106 of the pressure pump exceeds a certain threshold.

In some aspects, the analysis system 200 may also include an envelope filter 220 for use in analyzing signals received from the pressure sensor 202. The envelope filter 220 may represent a single filter or multiple filters for filtering a signal received from the pressure sensor 202. In some aspects, the envelope filter 220 may include a high-enveloping filter. The high-enveloping filter may immediately ramp up a signal received from the computing device 204 and slowly decay to trace the upper peaks of the signal. In additional and alternative aspects, the envelope filter 220 may include a low-enveloping filter. The low-enveloping filter may ramp down a signal received from the computing device 204 and slowly increase to trace the lower peaks of the signal. The envelope filter 220 may be a digital or analog filter.

In some aspects, the pressure pump 100 may also be coupled to or otherwise in fluid communication with a wellbore 222. For example, the pressure pump 100 may be used in hydraulic fracturing to inject fluid into the wellbore 222. Subsequent to the fluid passing through the chambers 106 of the pressure pump 100, the fluid may be injected into the wellbore 222 at a high pressure to break apart or otherwise fracture rocks and other formations in the wellbore 222 to release hydrocarbons. Although hydraulic fracturing is described here, the pressure pump 100 may be used in other wellbore treatments, or in any process or environment requiring a positive displacement pressure pump.

Figure 3:
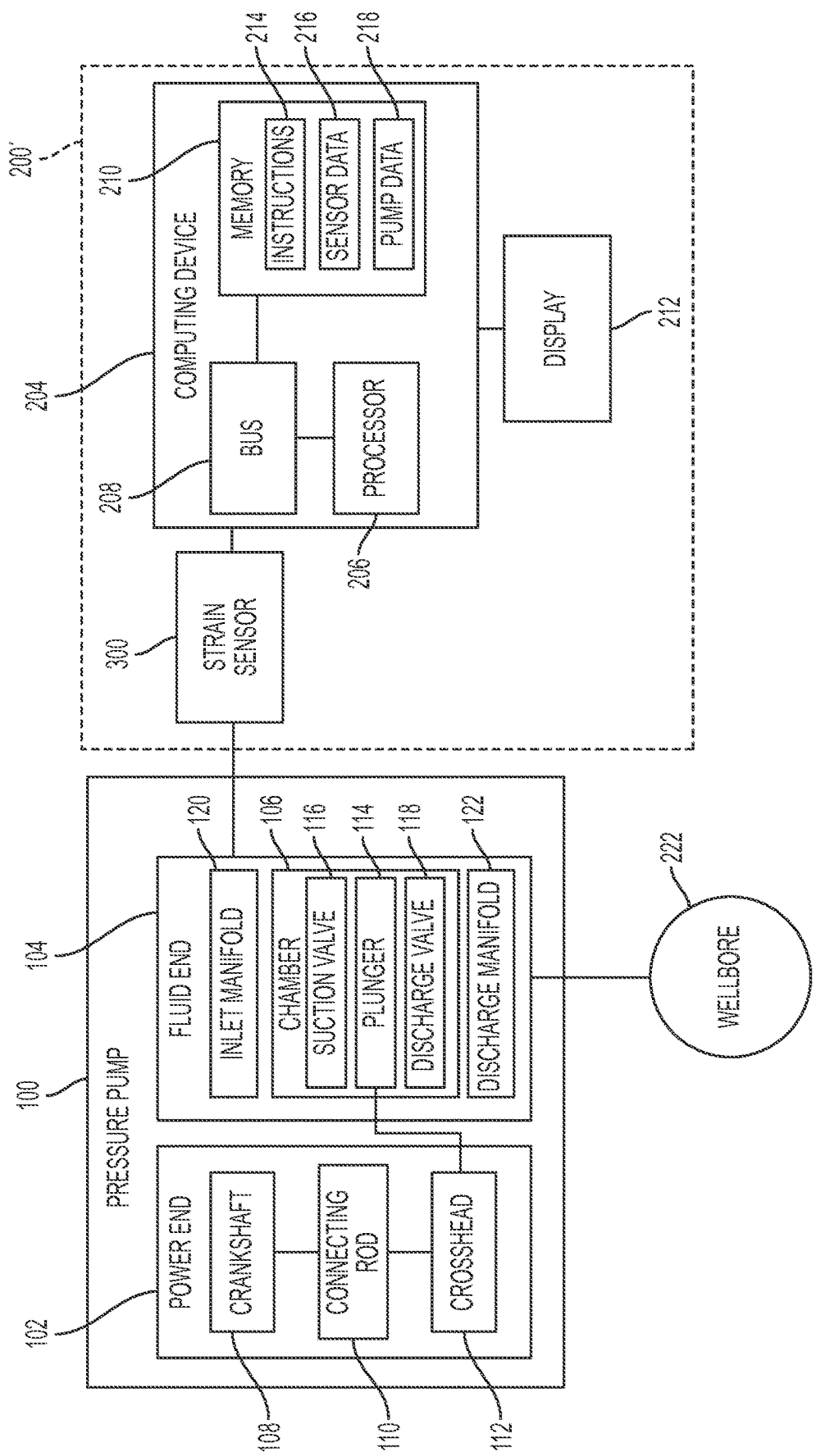
FIG. 3 is a block diagram depicting an analysis system for a pressure pump including a strain sensor according to one aspect of the present disclosure.

FIG. 3 shows an example of an analysis system 200' having a single measurement sensor including a strain sensor 300 in place of the pressure sensor 202 described the analysis system 200 of FIG. 2. The strain sensor 300 may be positioned on the fluid end 104 of the pressure pump 100. The strain sensor 300 may be a strain gauge, a strain transducer, or other sensor for measuring the strain in a chamber 106 of the pressure pump 100. Non-limiting examples of types of strain sensors 300 may include electrical resistance strain gauges, semiconductor strain gauges, fiber optic strain gauges, micro-scale strain gauges, capacitive strain gauges, vibrating wire strain gauges, etc. In some aspects, the analysis system 200' may include a strain sensor 300 for each chamber 106 of the pressure pump 100 to determine strain in each of the chambers 106, respectively. In some aspects, the strain sensor 300 may be positioned on an external surface of the fluid end 104 of the pressure pump 100 in a position subject to strain in response to stress in the chamber 106. For example, the strain sensor 300 may be positioned on a section of the fluid end 104 in a manner such that when the chamber 106 loads up, strain may be present at the location of the strain sensor 300. This location may be determined based on engineering estimations, finite element analysis, or by some other analysis to determine a location in communication with the strain in the chamber 106. For example, finite element analysis may determine that strain in the chamber 106 may be directly over a plunger bore of the chamber 106 during load up. The strain sensor 300 may be placed on an external surface of the pressure pump 100 in a location directly over the plunger bore corresponding to the chamber 106 to measure strain in the chamber 106. The strain sensor 300 may generate a strain signal representing strain in the chamber 106 and transmit the strain signal to the processor 206. The computing device 204 may receive the strain signal from the strain sensor 300 and apply signal-processing algorithms stored as instructions 214 in the memory 210 to determine the suction pressure and the discharge pressure in the chamber 106 corresponding to the strain sensor 300.

Figure 4:
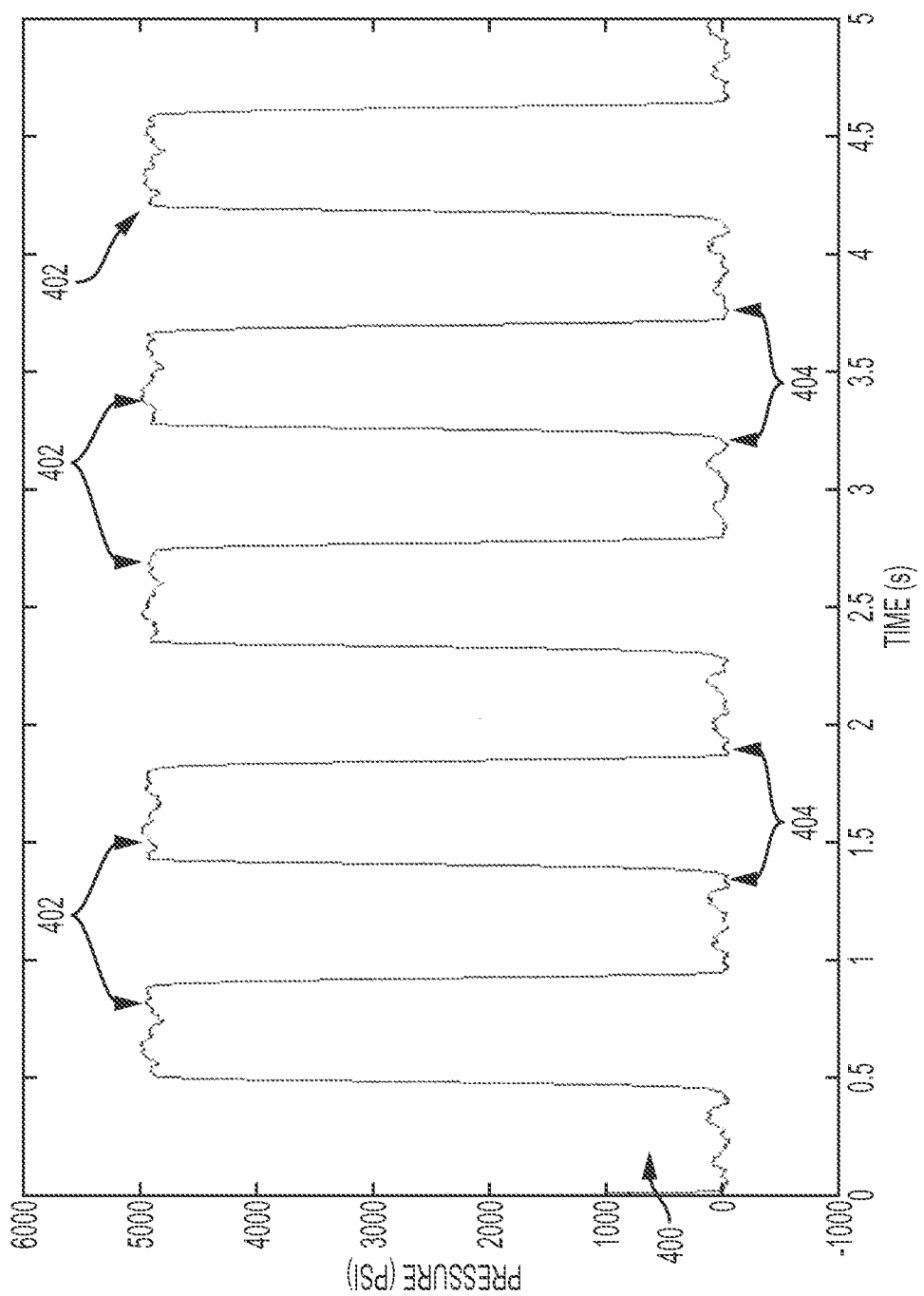
FIG. 4 is a signal graph depicting a pressure signal generated by a pressure sensor of the analysis system of FIG. 2 according to one aspect of the present disclosure.
Figure 5:
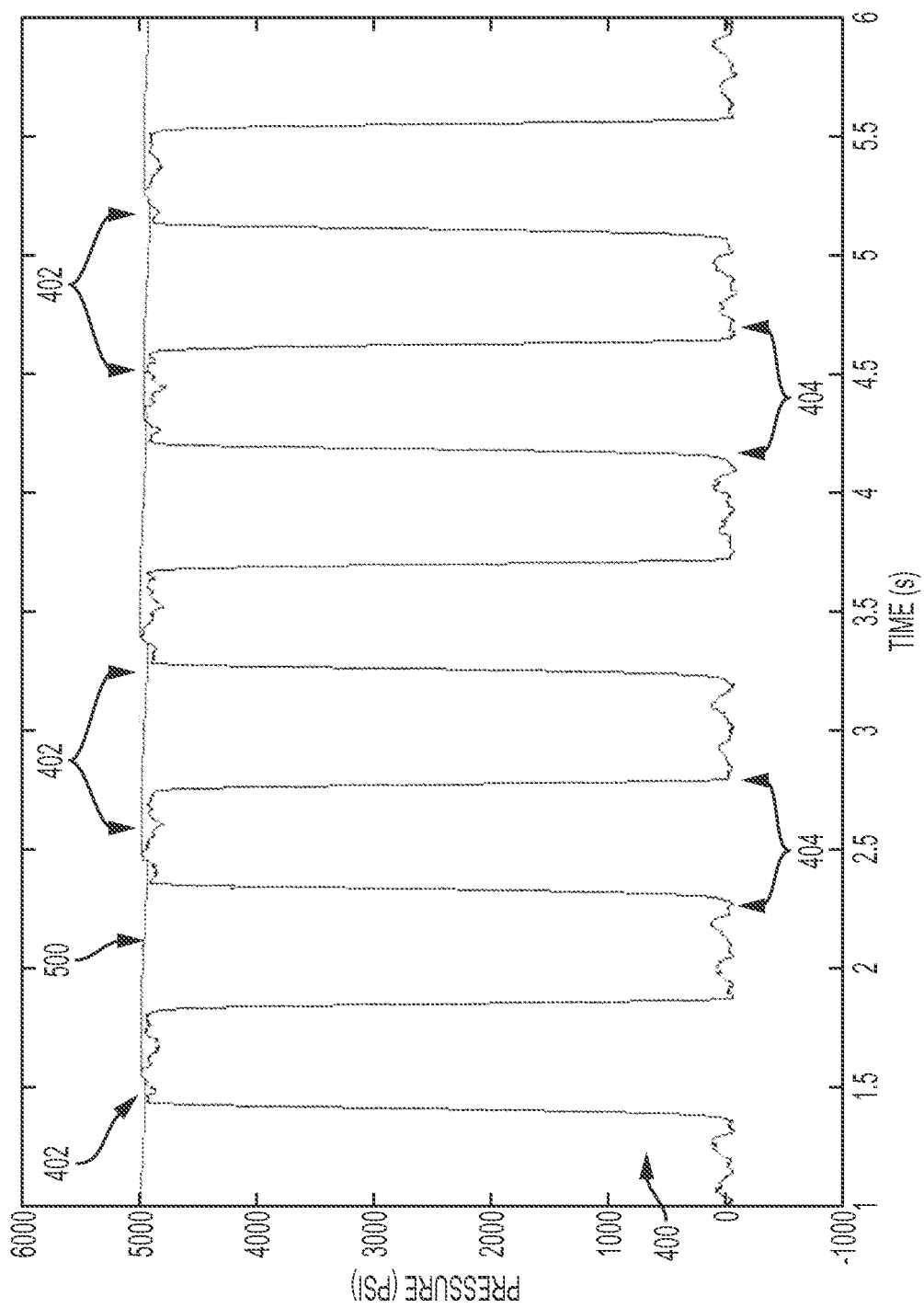
FIG. 5 is a signal graph depicting a discharge pressure reading derived from the pressure signal of FIG. 4 according to one aspect of the present disclosure.

FIGS. 4 and 5 show an example of a pressure signal 400 that may be generated by the pressure sensor 202 of the analysis system 200 according to some aspects. In some aspects, the pressure signal 400 may be shown on the display unit 212 in response to a generation of a graphical representation of the pressure signal 400 by the computing device 204. FIG. 4 shows the pressure signal 400 displayed in pounds per square inch over time in seconds. The pressure signal 400 may oscillate in response to a fluctuation in pressure in a chamber 106 of the pressure pump 100. The pressure in the chamber 106 may fluctuate as the suction valves 116 and the discharge valves 118 open and close to allow fluid to flow into and out of the chamber 106. In some aspects, the pressure in the chamber 106 may be at its highest when the discharge valve 118 is in an open position to allow fluid to flow out of the chamber 106 into the discharge manifold 122. The pressure in the chamber 106 may be at its lowest when the suction valve 116 is in an open position to allow fluid to flow into the chamber 106 from the inlet manifold 120. Accordingly, the upper peaks 402 of the pressure signal 400 may correspond to the discharge pressure in the chamber 106. The upper peaks 402 may occur during the time between the opening and closing of the discharge valve 118 in the chamber 106. The lower peaks 404 of the pressure signal 400 may correspond to the suction pressure in the chamber 106. The lower peaks 404 may occur during the time between the opening and closing of the suction valve 116 in the chamber 106.

FIG. 5 shows an example of a filtered signal reading 500 that may be derived from the pressure signal 400. The filtered signal reading 500 may be generated by the computing device 204 applying the envelope filter 220 to the pressure signal 400. For example, the envelope filter 220 applied to the pressure signal 400 may be a high-enveloping filter. The envelope filter 220 may include a rapid response and a slow decay to trace the upper peaks 402 of the pressure signal 400 and to simulate the missing portions of the signal (e.g., the lower peaks 404) over time as shown by the overlay of the filtered signal reading 500 on the pressure signal 400 in FIG. 5. Since the envelope filter 220 traces the upper peaks 402 corresponding to the discharge pressure in the chamber 106, the filtered signal reading 500 may represent the discharge pressure in the chamber 106.

Although FIG. 5 shows an example of a filtered signal reading 500 generated by the computing device 204 applying a high-enveloping filter, the computing device 204 may likewise generate a filtered signal reading by applying a low-enveloping filter to the pressure signal 400 without departing from the scope of the present disclosure. For example, the envelope filter 220 may include a low-enveloping filter. The computing device 204 may apply the envelope filter 220 to the pressure signal 400 to generate a filtered signal reading that traces the lower peaks 404 corresponding to the suction pressure in the chamber 106. The envelope filter 220 may include a rapid response and a slow increase to trace the lower peaks 404 of the pressure signal 400 and to simulate the missing portions of the signal (e.g., the upper peaks 402) over time. Since the envelope filter 220 traces the lower peaks 404 corresponding to the suction pressure in the chamber 106, the resulting filtered signal reading may represent the suction pressure in the chamber 106. In some aspects, the reading of the discharge pressure or the suction pressure in the chamber 106 may be combined with discharge pressure readings or suction pressure readings in other chambers to provide a more accurate reading of the discharge pressure or the suction pressure in the fluid end 104 of the pressure pump 100.

Figure 6:
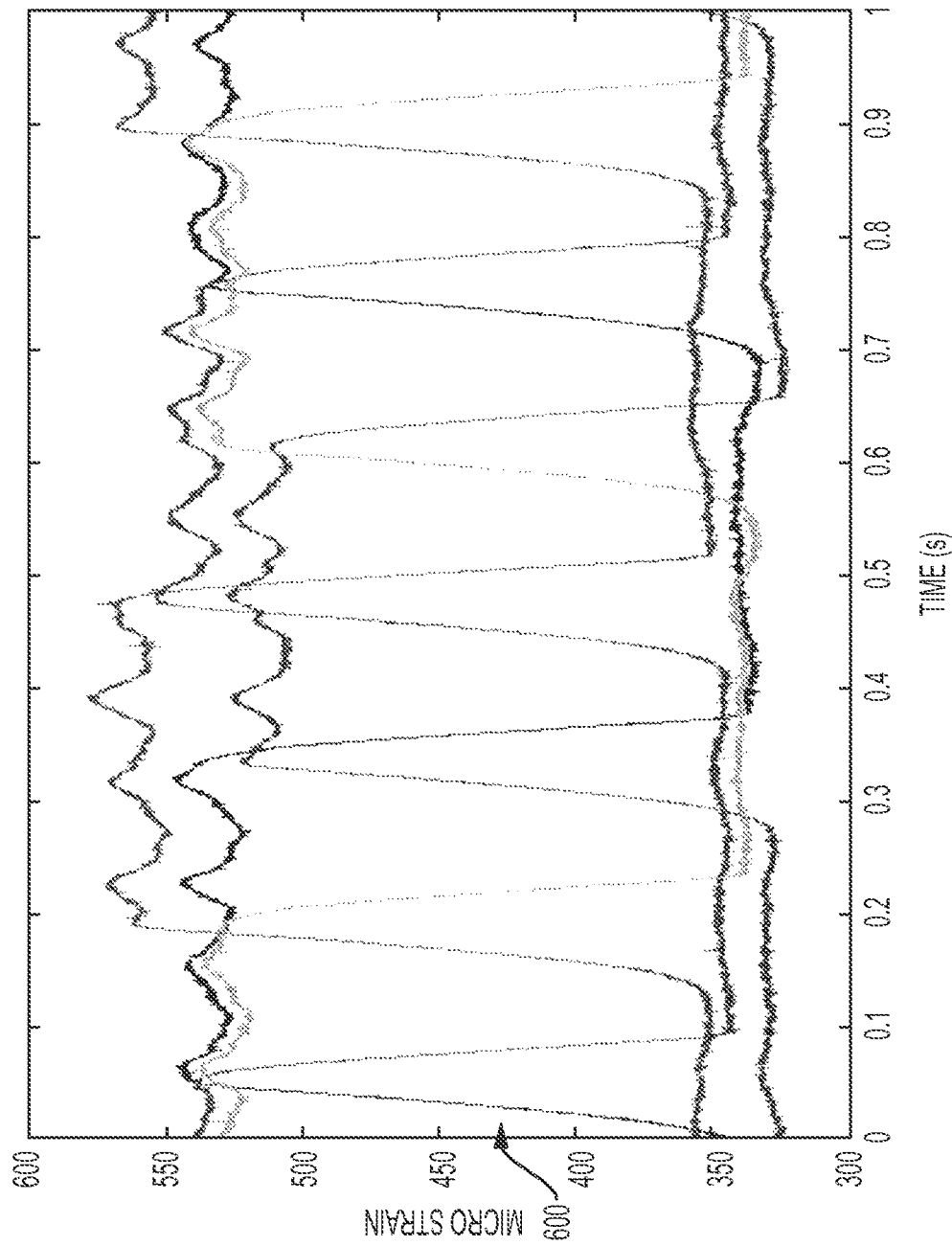
FIG. 6 is a signal graph depicting strain signals generated by a strain sensor of the analysis system of FIG. 3 according to one aspect of the present disclosure.
Figure 7:
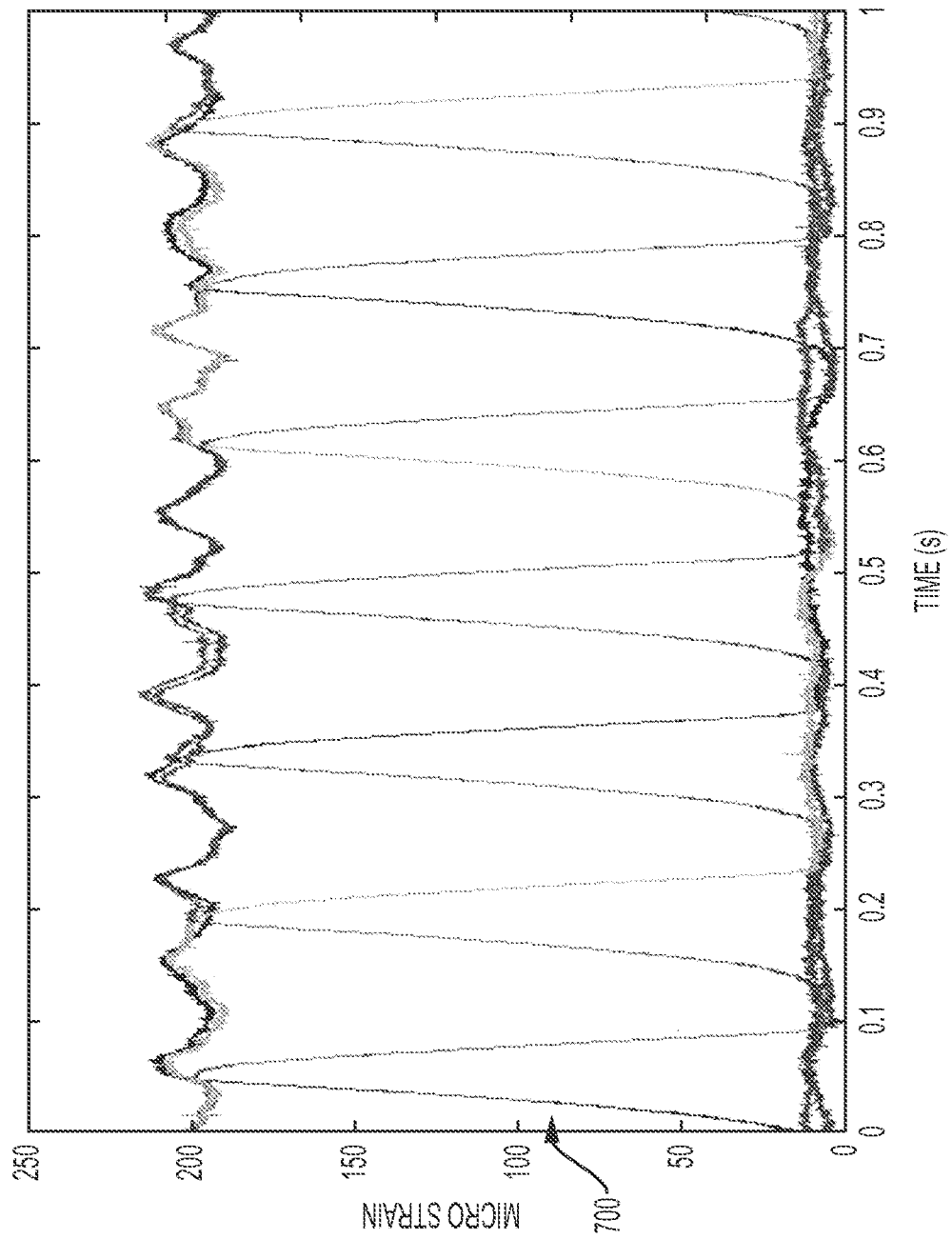
FIG. 7 is a signal graph depicting aligned strain signals derived from the strain signals of FIG. 6 according to one aspect of the present disclosure.

FIGS. 6 and 7 show an example of strain signals that may be generated by strain sensors 300 of the analysis system 200' according to some aspects. FIG. 6 shows raw strain signals 600. Each of the raw strain signals 600 may be generated by a separate strain sensor 300 coupled to each chamber 106 of the pressure pump 100. FIG. 6 shows the raw strain signals 600 displayed in micro-strains over time in seconds. The raw strain signals 600, like the pressure signal 400, may oscillate in response to a fluctuation in pressure and stress in each chamber 106 of the pressure pump 100 as the suction valve 116 and the discharge valve 118 in each chamber open and close. The strain sensors 300 may be positioned on each of the chambers 106 in a location subject to the strain in the chamber 106. The raw strain signals 600 for each chamber 106 may be offset as shown in FIG. 5 when the strain sensors 300 are non-zeroed. FIG. 7 shows an example of aligned strain signals 700 representing the strain in each chamber 106 of the pressure pump 100. In some aspects, the aligned strain signals 700 may be generated from the raw strain signals 600 by the computing device 204. For example, the processor 206 may execute instructions 214 for zeroing or aligning the raw strain signals 600 received from the strain sensors 300. In other aspects, the strain sensors 300 may be zeroed and generate strain signals for each chamber 106 that are aligned as shown in FIG. 7.

In some aspects, the computing device 204 may perform signal-processing algorithms to determine the portions of the raw strain signals 600 or the aligned strain signals 700 associated with the suction valves 116 or the discharge valves 118 of the chamber 106 corresponding to the respective signals 600, 700. The portions of the raw strain signals 600 or the aligned strain signals 700 associated with the suction valves 116 may correspond to the suction side of the fluid end 104 and may be used in determining the suction pressure of the chamber 106 or fluid end 104. The portions of the raw strain signals 600 or the aligned strain signals 700 associated with the discharge valves 118 may correspond to the discharge side of the fluid end 104 and may be used in determining the discharge pressure of the chamber 106 or fluid end 104. In some aspects, the computing device 204 may determine these portions of the raw strain signals 600 and the aligned strain signals 700 by determining actuation points associated with the opening and closing of the suction valve 116 and discharge valve 118 in each chamber 106 of the pressure pump 100.

Figure 8:
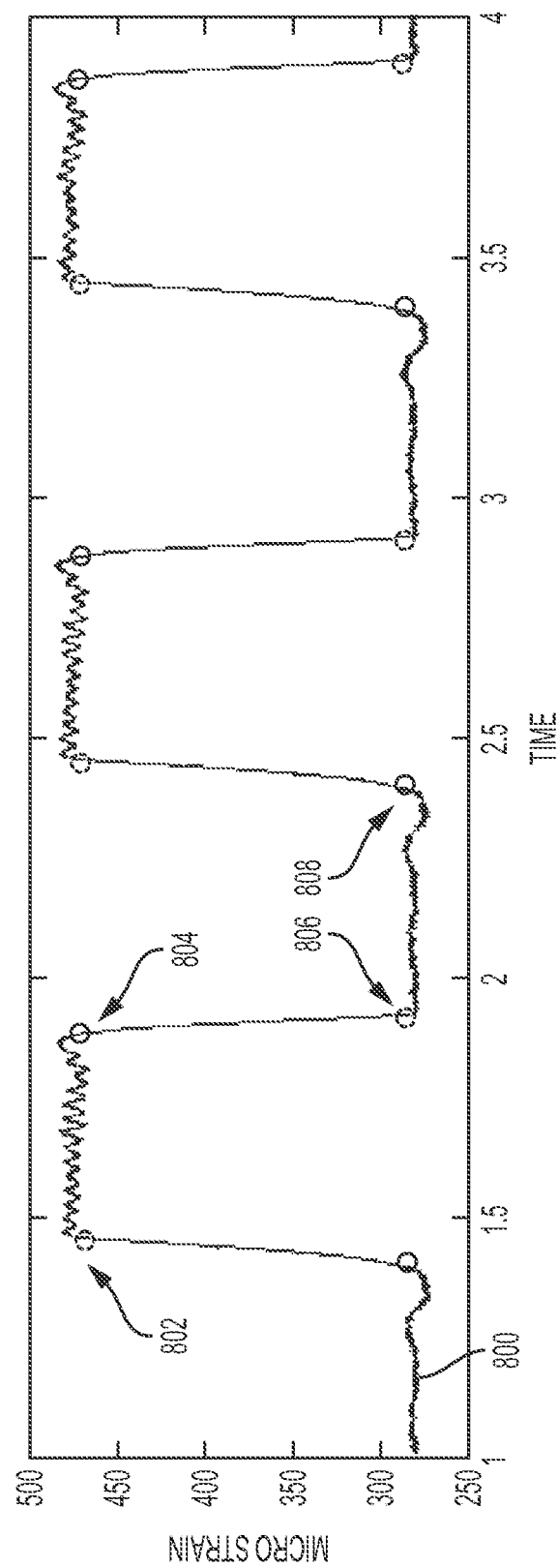
FIG. 8 is a signal graph depicting an example of actuation points that may be determined from strain signals according to one aspect of the present disclosure.

FIG. 8 shows a generic strain signal 800 to illustrate a determination of actuation points 802, 804, 806, 808. Actuation points may similarly be determined for each of the raw strain signals 600 or the aligned strain signals 700. The computing device 204 may determine the actuation points 802, 804, 806, 808 of the suction valve 116 and the discharge valve 118 for the chamber 106 based on the strain signal 800. The actuation points 802, 804, 806, 808 may represent the point in time where the suction valve 116 and the discharge valve 118 open and close. The computing device 204 may execute the instructions 214 stored in the memory 210 and including signal-processing algorithms to determine the actuation points 802, 804, 806, 808. For example, the computing device 204 may execute instructions 214 to determine the actuation points 802, 804, 806, 808 by determining discontinuities in the strain signal 800. The computing device 204 may similarly determine actuation points for the raw strain signals 600 or the aligned strain signals 700 by determining discontinuities in the respective strain signals 600, 700.

The stress in the chamber 106 may change during the operation of the suction valve 116 and the discharge valve 118 to cause discontinuities in the strain signal 600, 700 during actuation of the valves 116, 118. The computing device 204 may identify the discontinuities as the opening and closing of the valves 116, 118. For example, the strain in the chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signals 600, 700 show a sudden increase or decrease in value corresponding to the actuation of the valves 116, 118.

Referring back to the generic strain signal 800 of FIG. 8, actuation point 802 may represent the discharge valve 118 opening. Actuation point 804 may represent the discharge valve 118 closing. Actuation point 806 may represent the suction valve 116 opening. Actuation point 808 may represent the suction valve 116 closing to resume the cycle of fluid into and out of the chamber 106. In some aspects, the computing device 204 may cause the display unit 212 to display strain signals 600, 700 and actuation points identified based on discontinuities in the strain signals 600, 700 as illustrated in FIG. 8. The portions of the strain signal 800 between the actuation points 802, 804, 806, 808 for the suction valve 116 and the discharge valve 118 may be used to determine discharge pressure and suction pressure in the chamber 106. For example, the portion of the strain signal 800 between actuation points 802, 804 may represent a time that the discharge valve 118 is in an open position during operation of the pressure pump 100. The portion of the strain signal 800 between actuation points 806, 808 may represent a time that the suction valve 116 is in an open position during operation of the pressure pump. The computing device 204 may determine actuation points for the strain signals 600, 700 in a similar manner and may extract the portions of the signals 600, 700 corresponding to the open period of the suction valve 116 or discharge valve 118 to determine the suction pressure or discharge pressure, respectively.

Figure 9:
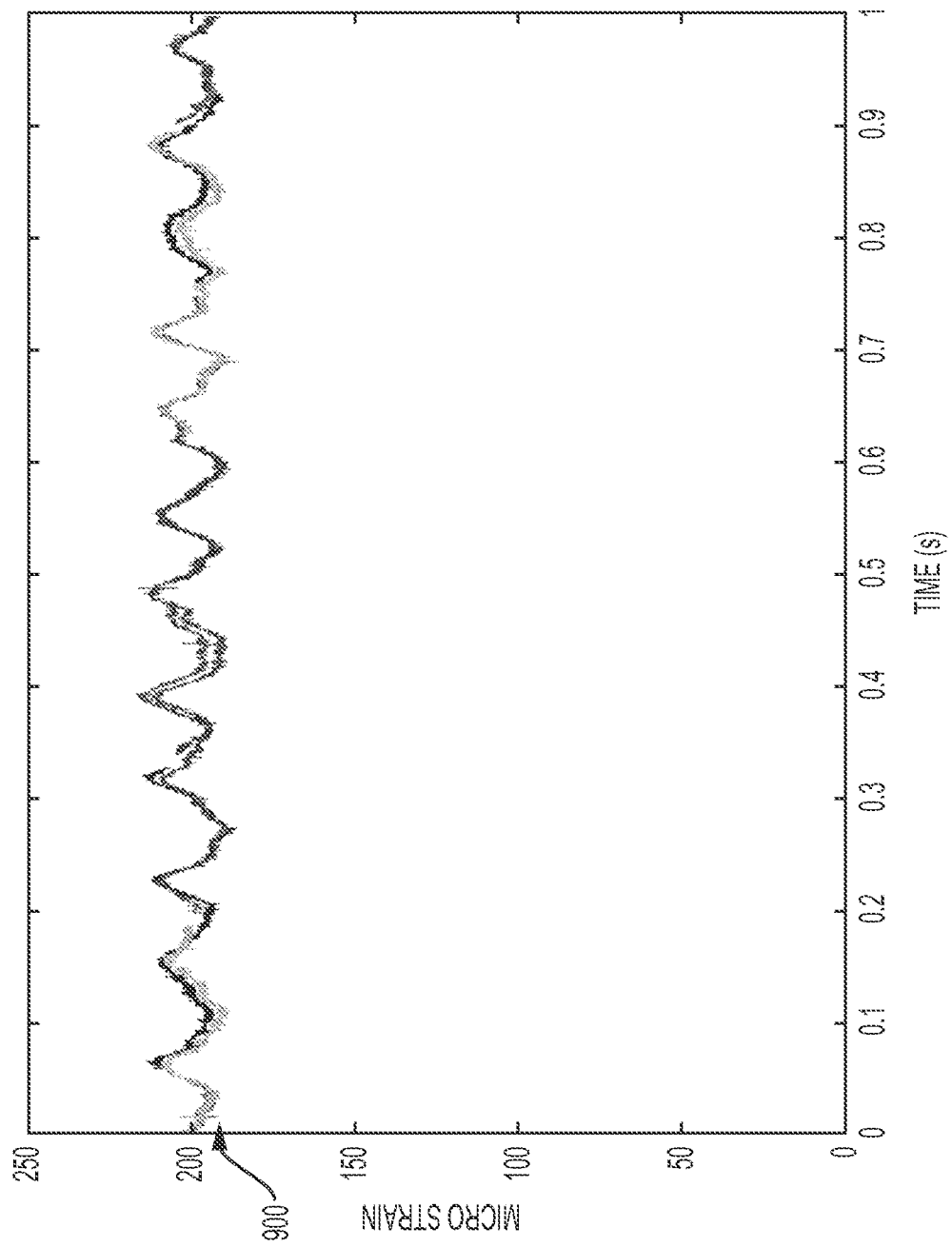
FIG. 9 is a signal graph depicting discharge signal portions of the aligned strain signals of FIG. 8 according to one aspect of the present disclosure.
Figure 10:
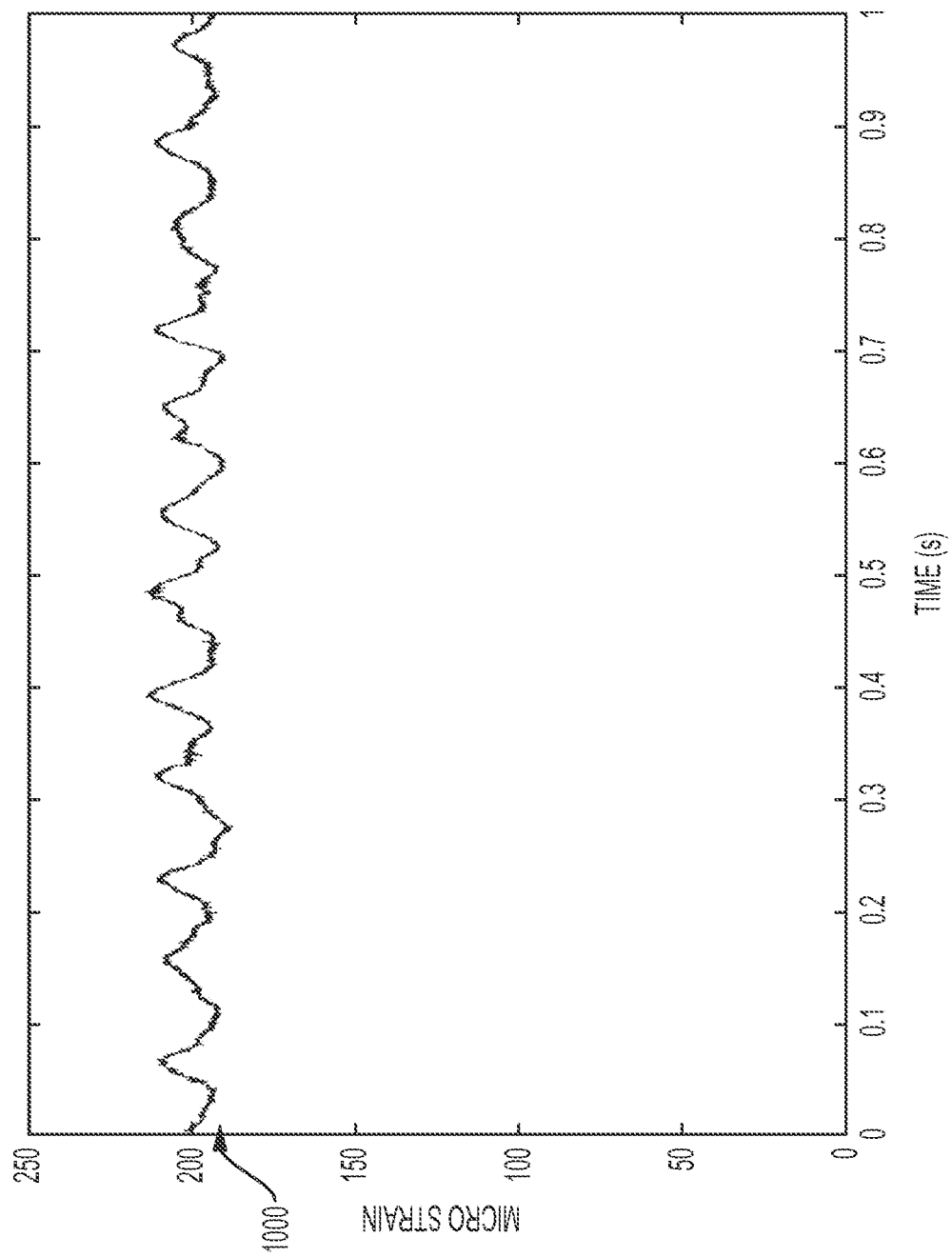
FIG. 10 is a signal graph depicting an average of the discharge signal portions of FIG. 9 according to one aspect of the present disclosure.

FIG. 9 shows a display of the discharge signal portions 900 of the aligned strain signals 700. The discharge signal portions 900 may represent the time between the actuation points for each of the aligned strain signals 700 that the discharge valve 118 is in an open position in each chamber 106 of the pressure pump 100. The discharge signal portions 900 may be averaged or otherwise combined to create a continuous strain signal 1000 as shown in FIG. 10. The continuous strain signal 1000 may represent the overall strain on the discharge side of the fluid end 104.

Figure 11:
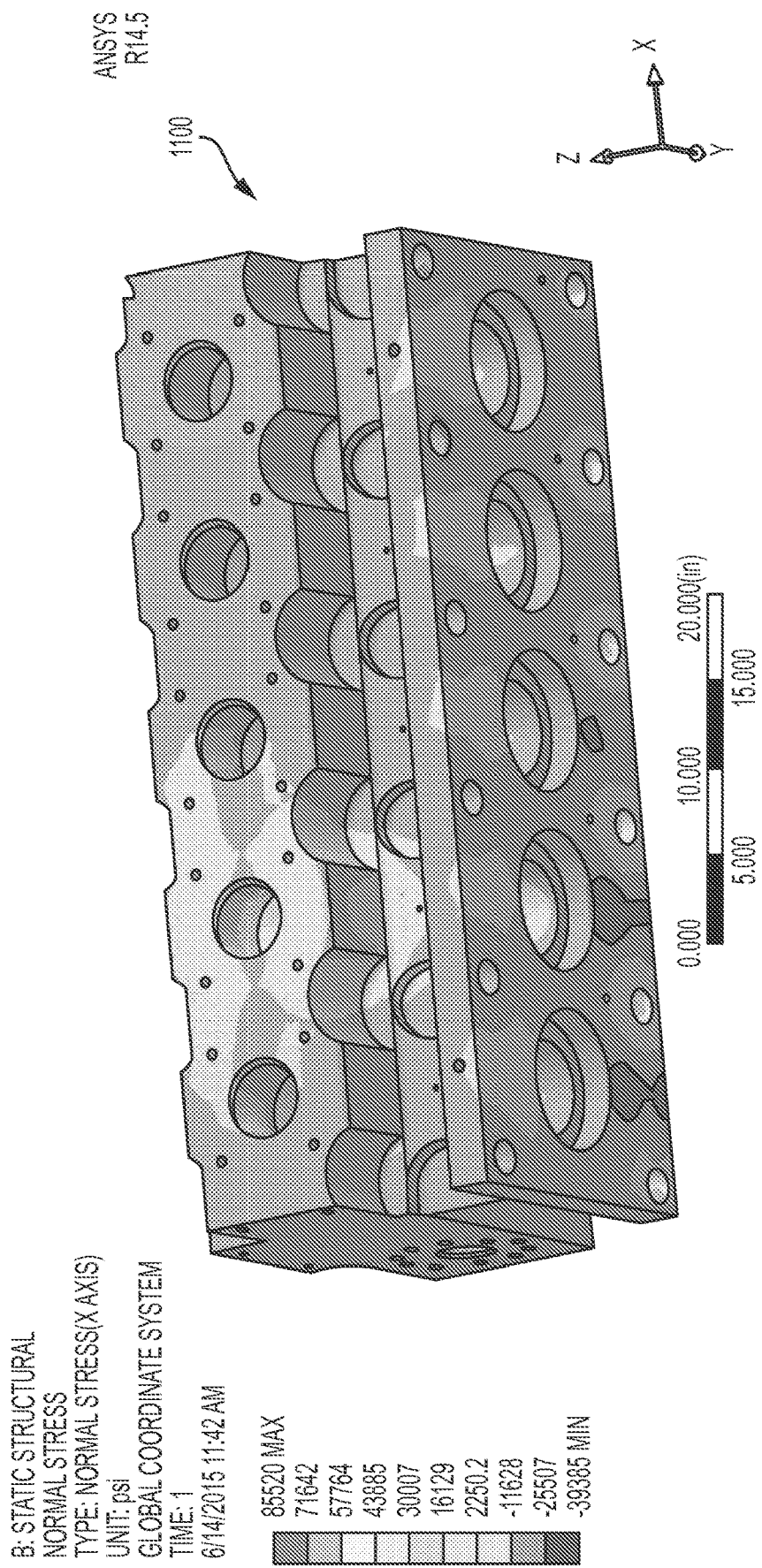
FIG. 11 is a finite element model that may be used to correlate the discharge signal portions of FIG. 10 according to one aspect of the present disclosure.

The continuous strain signal 1000 may be correlated with a known or estimated internal pressure in the fluid end 104 of the pressure pump 100 to determine the discharge pressure in the fluid end 104. The internal pressure in the fluid end may be determined by engineering estimates, testing, experimentation, or via some other input means. In some aspects, the internal pressure of the fluid end 104 may be estimated using finite element analysis of the pressure pump 100. Finite element analysis may be performed to predict how the pressure pump 100 may respond or react to real-world forces. An operator may input or store pump properties concerning the pressure pump 100 and the fluid properties concerning the fluid flowing through the pressure pump 100 in the memory 210 of the computing device 204 as pump data 218. The computing device 204 may perform finite element analysis to generate a finite element model representing the pressure pump 100 based on the input pump data 218. FIG. 11 shows an example of a finite element model 1100 that may represent the pressure pump 100. The finite element model 1100 may simulate the operation of the pressure pump 100 in the conditions derived from the pump properties and fluid properties input as pump data 218 to estimate an internal pressure in the fluid end 104 based on the input pump data 218. The correlation of strain and pressure may only be required once for a given set of pump properties of the pressure pump 100. The correlation may be stored in the memory 210 of the computing device 204 as pump data 218 for future determinations requiring internal pressure measurements from strain.

Figure 12:
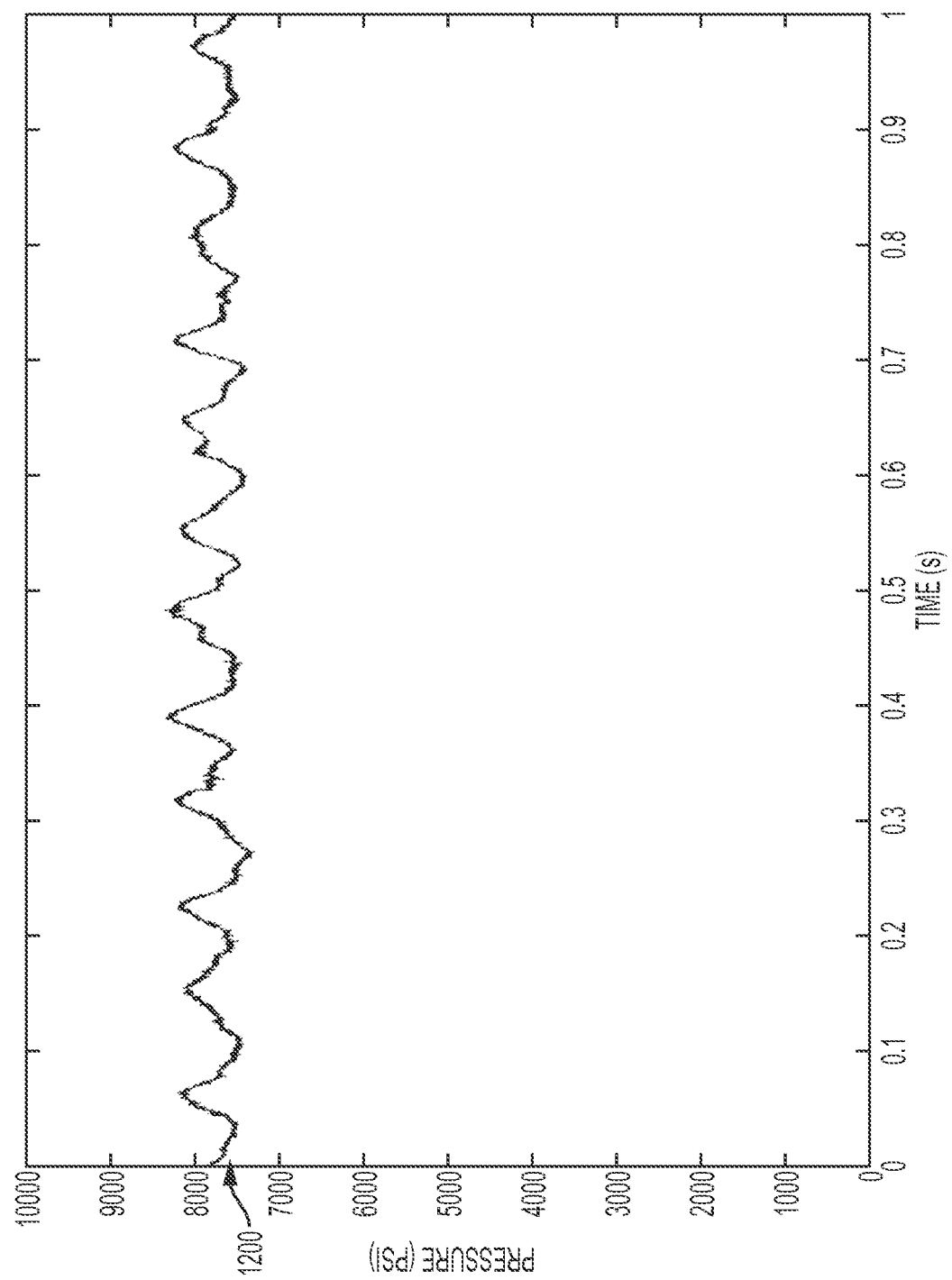
FIG. 12 is a signal graph depicting a discharge pressure readings derived from the discharge signal portions of FIG. 10 according to one aspect of the present disclosure.

FIG. 12 shows a discharge pressure reading 1200 generated by the computing device 204. In some aspects, the computing device 204 may correlate the continuous strain signal 1000 shown in FIG. 10 to the internal pressure estimated using finite element analysis to generate the discharge pressure reading 1200. The discharge pressure reading 1200 may represent the discharge pressure in the fluid end 104 of the pressure pump 100. The discharge pressure in each chamber 106 may similarly be determined by correlating the discharge signal portions 900 for each chamber 106 with the internal pressure. In some aspects, the computing device 204 may extract the portions of the strain signal 600, 700 corresponding to the open period of the suction valve 116. The computing device 204 may average the portions corresponding to the open period of the suction valve 116 to generate a continuous strain signal representing the overall strain on the suction side of the fluid end 104. The computing device 204 may determine the suction pressure in the fluid end 104 by correlating the continuous strain signal with the internal pressure to generate a suction pressure reading for the fluid end 104.

Figure 13:
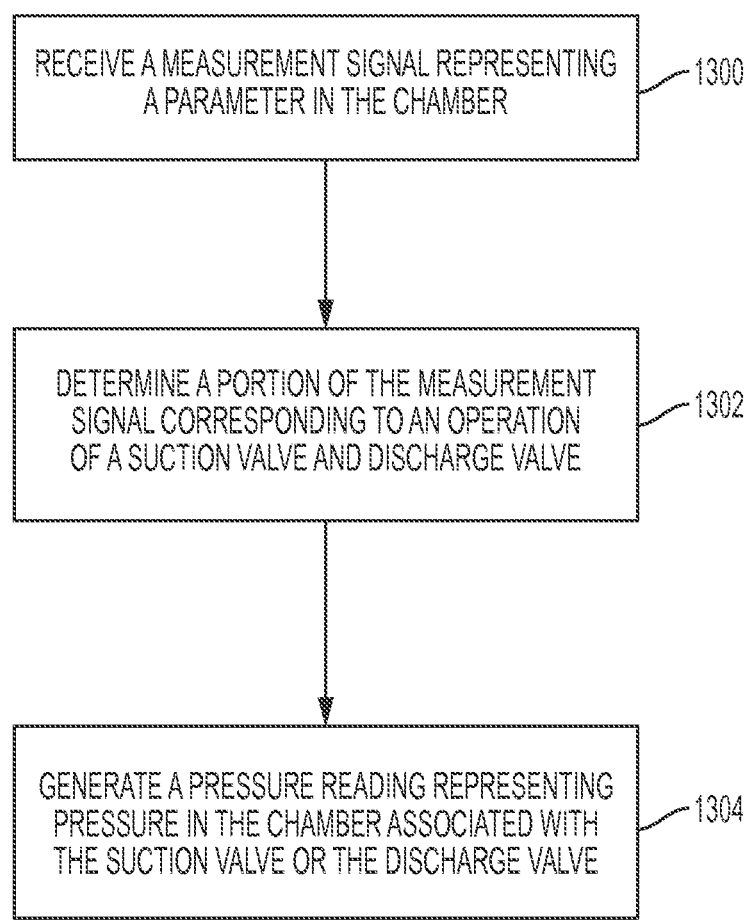
FIG. 13 is a flowchart depicting a process for analyzing pressure in a pressure pump according to one aspect of the present disclosure.

FIG. 13 shows a process for analyzing pressure in a pressure pump. The process is described with respect to the analysis systems 200, 200' shown in FIGS. 2 and 3, although other implementations are possible without departing from the scope of the present disclosure.

In block 1300, the computing device 204 may receive a measurement signal from a measurement sensor. The measurement signal may represent a parameter in the chamber 106. The parameter may be associated with an operation of the suction valve 116 or the discharge valve 118 in the chamber. In some aspects, the measurement sensor may include the pressure sensor 202 as described in FIG. 2. The pressure sensor 202 may measure the internal pressure in a chamber 106 of the pressure pump 100 and may generate a pressure signal 400 representing the total pressure in the chamber 106. The pressure signal 400 may oscillate as the pressure in the chamber 106 fluctuates in response to the movement of a plunger 114 in the chamber 106. The fluctuation in pressure may cause the suction valve 116 and the discharge valve 118 to open and close to control the flow of fluid through the chamber 106. The pressure sensor 202 may be coupled to the computing device 204 as shown in FIG. 2 to transmit the pressure signal 400 to the computing device 204. In other aspects, the measurement sensor may include the strain sensor 300 as described in FIG. 3. The strain sensor 300 may measure the strain in the chamber 106 of the pressure pump 100 and may generate a strain signal 600 representing the strain in the chamber 106. The strain signal 600 may oscillate in response to the fluctuation of the strain in the chamber 106 as the suction valve 116 and the discharge valve 118 open and close. The strain sensor 300 may be coupled to the computing device 204 as shown in FIG. 3 to transmit the strain signal 600 to the computing device 204.

In block 1302, the computing device 204 may determine the portion of the measurement signal (the pressure signal 400, strain signal 600) associated with the operation of the suction valve 116 or the discharge valve 118 in a chamber 106 of the pressure pump 100. The portion of the measurement signal associated with the operation of the suction valve 116 may correspond to the suction side of the fluid end 104 and chamber 106. The portion of the measurement signal associated with the operation of the discharge valve 118 may correspond to the discharge side of the fluid end 104 and chamber 106. For the pressure signal 400, the computing device 204 may determine the portion of the pressure signal 400 associated with the discharge valve 118 by identifying the upper peaks of the pressure signal 400. The computing device 204 may determine the portion of the pressure signal 400 associated with the suction valve 116 by identifying the lower peaks of the pressure signal 400. For the strain signal 600, the computing device 204 may determine the portions of the strain signal 600 associated with the discharge valve 118 by identifying the actuation points 802, 804 associated with the opening and closing of the discharge valve 118. The portion of the strain signal 600 between the actuation points 802, 804 may represent the amount of time that the discharge valve 118 is in an open position. The computing device 204 may determine the portions of the strain signal 600 associated with the suction valve 116 by identifying the actuation points 806, 808 associated with the opening and closing of the suction valve 116. The portion of the strain signal 600 between the actuation points 806, 808 may represent the amount of time that the suction valve 116 is in an open position.

In block 1304, the computing device 204 may generate a pressure reading associated with the suction valve 116 or the discharge valve 118. The pressure associated with the suction valve 116 may include the suction pressure in the chamber 106. The pressure associated with the discharge valve 118 may include the discharge pressure in the chamber 106. For the pressure signal 400, the computing device 204 may generate the pressure reading by applying the envelope filter 220 to the pressure signal 400. The envelope filter 220 may include a low-enveloping filter to generate a pressure reading corresponding to the suction pressure in the chamber 106. The envelope filter 220 may include a high-enveloping filter to generate a pressure reading corresponding to the discharge pressure in the chamber 106. For the strain signal 600, the computing device 204 may generate the pressure reading by correlating the strain signal 600 with the internal pressure of the chamber 106. The internal pressure may be previously determined estimation of the internal pressure in the chamber 106 and stored as pump data 218 in the memory 210. The internal pressure may be determined by experimentation, testing, or other means as described in FIGS. 9-11. The pressure reading corresponding to the discharge pressure in the chamber 106 may be generated by correlating the discharge signal portions 900 of the strain signal 600 with the predetermined internal pressure in the chamber 106. The pressure reading corresponding to the suction pressure in the chamber 106 may be generated by correlating the suction signal portions of the strain signal 600 with the predetermined internal pressure in the chamber 106.

In some aspects, pumping systems are provided according to one or more of the following examples:

Example #1

A system for a pump may comprise a single measurement sensor positionable on a fluid end of the pump to measure a parameter in a chamber of the pump and generate a measurement signal representing the parameter in the chamber. The parameter may be associated with an operation of a suction valve and a discharge valve in the chamber. The measurement signal may be usable in determining a discharge pressure or a suction pressure in the chamber. The system may also comprise a computing device couplable to the single measurement sensor. The computing device may include a processing device for which instructions executable by the processing device are used to cause the processing device to determine the discharge pressure or the suction pressure in the chamber using the measurement signal.

Example #2

The system of Example #1 may feature the single measurement sensor being a pressure sensor. The measurement signal may represent a total pressure in the chamber. The total pressure may include the discharge pressure and the suction pressure. The system may also feature the computing device including a memory device having instructions executable by the processing device for causing the processing device to determine a discharge portion of the measurement signal corresponding to the discharge pressure by applying a high-enveloping filter to the measurement signal to generate a discharge pressure reading representing the discharge pressure in the chamber.

Example #3

The system of Examples #1-2 may feature the single measurement sensor being a pressure sensor. The measurement signal may represent a total pressure in the chamber. The total pressure may include the discharge pressure and the suction pressure. The computing device may include a memory device including instructions executable by the processing device for causing the processing device to determine a suction portion of the measurement signal corresponding to the suction pressure by applying a low-enveloping filter to the measurement signal to generate a suction pressure reading representing the suction pressure in the chamber.

Example #4

The system of Examples #1-3 may feature the single measurement sensor being a strain sensor. The measurement signal may represent strain in the chamber. The computing device may include a memory device having instructions executable by the processing device for causing the processing device to determine a discharge portion of the measurement signal by identifying a strain signal portion between discontinuities in the measurement signal corresponding to valve actuation points for an opening and a closing of the discharge valve during operation of the pump, the strain signal portion being representative of the discharge portion of the measurement signal. The memory device may also have instructions executable by the processing device for causing the processing device to generate a discharge pressure reading representing the discharge pressure in the chamber by correlating the discharge portion with an internal pressure in the chamber.

Example #5

The system of Examples #1-4 may feature the measurement signal representing strain in the chamber. The computing device may include a memory device including instructions executable by the processing device for causing the processing device to determine a suction portion of the measurement signal by identifying a strain signal portion between discontinuities in the measurement signal corresponding to valve actuation points for an opening and a closing of the suction valve during operation of the pump, the strain signal portion being representative of the suction portion of the measurement signal. The memory device may also include instructions executable by the processing device for causing the processing device to generate a suction pressure reading representing the suction pressure in the chamber by correlating the suction portion with an internal pressure in the chamber.

Example #6

The system of Examples #1-5 may also comprise an additional strain sensor corresponding to an additional chamber in the fluid end of the pump. The additional strain sensor may be couplable to the additional chamber to measure strain in the additional chamber and generate an additional signal corresponding to the strain in the additional chamber. The single measurement sensor may be a strain sensor. The measurement signal may represent the strain in the chamber.

Example #7

The system of Examples #1-6 may feature the computing device including a memory device including instructions executable by the processing device for causing the processing device to determine a first portion of the measurement signal by identifying a first strain signal portion between a first pair of discontinuities in the measurement signal corresponding to chamber valve actuation points for one of the discharge valve or the suction valve in the chamber. The memory device may also include instructions executable by the processing device for causing the processing device to determine a second portion of the additional signal by identifying a second strain signal portion between a second pair of discontinuities in the additional signal corresponding to additional chamber valve actuation points for one of an additional discharge valve or an additional suction valve in the additional chamber. The memory device may also include instructions executable by the processing device for causing the processing device to generate a pressure reading representing fluid end discharge pressure or fluid end suction pressure in the fluid end of the pump by averaging the first portion and the second portion to generate an average strain signal portion and correlating the average strain signal portion with an internal pressure in the fluid end of the pump.

Example #8

The system of Examples #1-7 may feature the measurement signal representing strain in the chamber. The computing device may include a memory device including instructions executable by the processing device for causing the processing device to correlate the measurement signal with an internal pressure in the chamber using finite element analysis of the pump to generate a reading representing a total pressure in the chamber including the discharge pressure and the suction pressure.

Example #9

The system of Examples #1-8 may feature the pump being coupled to a wellbore. The pump may be operated to inject fluid into the wellbore to stimulate production from formations located adjacent to the wellbore.

Example #10

A pumping system may comprise a pump including a fluid end having a chamber for receiving and discharging fluid in the pump. The chamber may include a suction side having a suction valve for controlling an inlet flow of fluid into the chamber and a discharge side having a discharge valve for controlling a discharge flow of fluid out of the chamber. The pumping system may also comprise a computing device couplable to the pump. The computing device may include a processing device for which instructions executable by the processing device are used to cause the processing device to determine a discharge pressure or a suction pressure in the chamber during operation of the pump using a signal from a single measurement sensor coupled to the fluid end of the pump.

Example #12

The pumping system of Example #10 may feature the signal representing a total pressure in the chamber. The total pressure may include the discharge pressure and the suction pressure. The computing device may include a memory device having instructions executable by the processing device for causing the processing device to determine a discharge portion of the signal corresponding to the discharge pressure by applying a high-enveloping filter to the signal to generate a discharge pressure reading representing the discharge pressure in the chamber.

Example #12

The pumping system of Examples #10-11 may feature the signal representing a total pressure in the chamber. The total pressure may include the discharge pressure and the suction pressure. The computing device may include a memory device having instructions executable by the processing device for causing the processing device to determine a suction portion of the signal corresponding to the suction pressure by applying a low-enveloping filter to the signal to generate a suction pressure reading representing the suction pressure in the chamber.

Example #13

The pumping system of Examples #10-12 may feature the signal representing strain in the chamber. The computing device may include a memory device having instructions executable by the processing device for causing the processing device to determine a discharge portion of the signal by identifying a strain signal portion between discontinuities in the signal corresponding to valve actuation points for an opening and a closing of the discharge valve during the operation of the pump, the strain signal portion being representative of the discharge portion of the signal. The memory device may also have instructions executable by the processing device for causing the processing device to generate a discharge pressure reading representing the discharge pressure in the chamber by correlating the discharge portion with an internal pressure in the chamber.

Example #14

The pumping system of Examples #10-13 may feature the signal representing strain in the chamber. The computing device may include a memory device including instructions executable by the processing device for causing the processing device to determine a suction portion of the signal by identifying a strain signal portion between discontinuities in the signal corresponding to valve actuation points for an opening and a closing of the suction valve during the operation of the pump. The strain signal portion may be representative of the suction portion of the signal. The memory device may also include instructions executable by the processing device for causing the processing device to generate a suction pressure reading representing the suction pressure in the chamber by correlating the suction portion with an internal pressure in the chamber.

Example #15

The pumping system of Examples #10-14 may feature the signal representing strain in the chamber. The computing device may include a memory device having instructions executable by the processing device for causing the processing device to correlate the signal with an internal pressure in the chamber using finite element analysis of the pump to generate a reading representing a total pressure in the chamber, the total pressure including the discharge pressure and the suction pressure.

Example #16

The pumping system of Examples #10-15 may feature the single measurement sensor comprising a pressure sensor couplable to the fluid end of the pump to measure a total pressure in the chamber and generate the signal. The signal may be representative of the total pressure in the chamber including the discharge pressure and the suction pressure. The single measurement sensor may be further couplable to the computing device to transmit the signal to the computing device.

Example #17

The pumping system of Examples #10-16 may feature the single measurement sensor comprising a strain sensor positionable on an external surface of the fluid end of the pump to measure strain in the chamber and generate the signal. The signal may be representative of the strain in the chamber. The single measurement sensor may be further couplable to the computing device to transmit the signal to the computing device.

Example #18

A method for analyzing pressure in a chamber of a pump may comprise comprising receiving, from a single measurement sensor coupled to a fluid end of the pump, a measurement signal representing a parameter in the chamber associated with an operation of a suction valve and a discharge valve in the chamber. The method may also comprise determining, by a computing device, a portion of the measurement signal associated with the operation of one of the suction valve or the discharge valve. The method may also comprise generating, by the computing device, a pressure reading representing the pressure in the chamber associated with one of the suction valve or the discharge valve using the portion of the measurement signal.

Example #19

The method of Example #18 may feature determining the portion of the measurement signal to include identifying an upper peak portion of the measurement signal corresponding to the operation of the discharge valve or identifying a lower peak portion of the measurement signal corresponding to the operation of the suction valve. The method may also feature generating the pressure reading to include applying a high-enveloping filter to the measurement signal to generate a discharge pressure reading representing discharge pressure in the chamber or applying a low-enveloping filter to the measurement signal to generate a suction pressure reading representing suction pressure in the chamber.

Example #20

The method of Examples #18-19 may feature determining the portion of the measurement signal to include determining actuation points for one of the suction valve or the discharge valve by identifying discontinuities in the measurement signal and identifying a strain signal portion between the actuation points. The method may also feature generating the pressure reading to include correlating the strain signal portion with a predetermined value representing an internal pressure in the chamber.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system for a pump, comprising:
    a single measurement sensor that includes a strain sensor, the single measurement sensor being positionable on a fluid end of the pump to measure strain in a chamber of the pump and generate a measurement signal representing the strain in the chamber, the strain being associated with an operation of a suction valve and a discharge valve in the chamber, the measurement signal being usable in determining a discharge pressure or a suction pressure in the chamber; and
    a computing device couplable to the single measurement sensor, the computing device including a processing device for which instructions executable by the processing device are used to cause the processing device:
        determine a suction portion of the measurement signal by identifying a strain signal portion between discontinuities in the measurement signal corresponding to valve actuation points for an opening and a closing of the suction valve during operation of the pump, the strain signal portion being representative of the suction portion of the measurement signal; and
        generate a suction pressure reading representing the suction pressure in the chamber by correlating the suction portion with an internal pressure in the chamber.

2. The system of claim 1, wherein the strain signal portion is a first strain signal portion, the discontinuities are a first pair of discontinuities, and the computing device includes a memory device including instructions executable by the processing device for causing the processing device to:
    determine a discharge portion of the measurement signal by identifying a second strain signal portion between a second pair of discontinuities in the measurement signal corresponding to chamber valve actuation points for the discharge valve during operation of the pump, the second strain signal portion being representative of the discharge portion of the measurement signal; and generate a discharge pressure reading representing the discharge pressure in the chamber by correlating the discharge portion with the internal pressure in the chamber.

3. The system of claim 1, further comprising:

an additional strain sensor corresponding to an additional chamber in the fluid end of the pump, the additional strain sensor being couplable to the additional chamber to measure strain in the additional chamber and generate an additional signal corresponding to the strain in the additional chamber.

4. The system of claim 3, wherein the computing device includes a memory device including instructions executable by the processing device for causing the processing device to:

determine a first portion of the measurement signal by identifying a first strain signal portion between a first pair of discontinuities in the measurement signal corresponding to chamber valve actuation points for one of the discharge valve or the suction valve in the chamber;

determine a second portion of the additional signal by identifying a second strain signal portion between a second pair of discontinuities in the additional signal corresponding to additional chamber valve actuation points for one of an additional discharge valve or an additional suction valve in the additional chamber; and generate a pressure reading representing fluid end discharge pressure or fluid end suction pressure in the fluid end of the pump by:
averaging the first portion and the second portion to generate an average strain signal portion, and
correlating the average strain signal portion with the internal pressure in the fluid end of the pump.

5. The system of claim 1, wherein the computing device includes a memory device including instructions executable by the processing device for causing the processing device to correlate the measurement signal with the internal pressure in the chamber using finite element analysis of the pump to generate a reading representing a total pressure in the chamber including the discharge pressure and the suction pressure.

6. The system of claim 1, wherein the pump is coupled to a wellbore, and wherein the pump is operated to inject fluid into the wellbore to stimulate production from formations located adjacent to the wellbore.

7. A pumping system, comprising:

a pump including a fluid end having a chamber for receiving and discharging fluid in the pump, the chamber including a suction side having a suction valve for controlling an inlet flow of fluid into the chamber and a discharge side having a discharge valve for controlling a discharge flow of fluid out of the chamber; and a computing device couplable to the pump, the computing device including a processing device for which instructions executable by the processing device are used to cause the processing device to determine a discharge pressure or a suction pressure in the chamber during operation of the pump using a signal from a single measurement sensor coupled to the fluid end of the pump;

wherein the single measurement sensor comprises a strain sensor positionable on an external surface of the fluid end of the pump to measure strain in the chamber and generate the signal, the signal being representative of the strain in the chamber, the single measurement sensor being further couplable to the computing device to transmit the signal to the computing device.

8. The pumping system of claim 7, wherein the computing device includes a memory device including instructions executable by the processing device for causing the processing device to:

determine a discharge portion of the signal by identifying a strain signal portion between discontinuities in the signal corresponding to valve actuation points for an opening and a closing of the discharge valve during the operation of the pump, the strain signal portion being representative of the discharge portion of the signal; and generate a discharge pressure reading representing the discharge pressure in the chamber by correlating the discharge portion with an internal pressure in the chamber.

9. The pumping system of claim 7, wherein the computing device includes a memory device including instructions executable by the processing device for causing the processing device to:

determine a suction portion of the signal by identifying a strain signal portion between discontinuities in the signal corresponding to valve actuation points for an opening and a closing of the suction valve during the operation of the pump, the strain signal portion being representative of the suction portion of the signal; and generate a suction pressure reading representing the suction pressure in the chamber by correlating the suction portion with an internal pressure in the chamber.

10. The pumping system of claim 7, wherein the computing device includes a memory device including instructions executable by the processing device for causing the processing device to correlate the signal with an internal pressure in the chamber using finite element analysis of the pump to generate a reading representing a total pressure in the chamber, the total pressure including the discharge pressure and the suction pressure.

11. The pumping system of claim 7, wherein the pump is coupled to a wellbore, and wherein the pump is configured to inject fluid into the wellbore to stimulate production from formations located adjacent to the wellbore.

12. A method for analyzing pressure in a chamber of a pump, comprising:

receiving, from a single measurement sensor coupled to a fluid end of the pump, a measurement signal representing a parameter in the chamber associated with an operation of a suction valve and a discharge valve in the chamber;

determining, by a computing device, a portion of the measurement signal associated with the operation of one of the suction valve or the discharge valve, wherein determining the portion of the measurement signal includes determining actuation points for one of the suction valve or the discharge valve by identifying discontinuities in the measurement signal and identifying a strain signal portion between the actuation points; and generating, by the computing device, a pressure reading representing the pressure in the chamber associated with one of the suction valve or the discharge valve using the portion of the measurement signal, wherein generating the pressure reading includes correlating the strain signal portion with a predetermined value representing an internal pressure in the chamber.

13. The method of claim 12, wherein the pump is coupled to a wellbore, and wherein the pump is operated to inject fluid into the wellbore to stimulate production from formations located adjacent to the wellbore.

14. The method of claim 12, further comprising determining the predetermined value using finite element analysis of the pump.

15. The method of claim 12, wherein the pressure reading represents a total pressure in the chamber, the total pressure including a discharge pressure and a suction pressure in the chamber.

16. The method of claim 12, wherein the portion of the measurement signal is a first portion of the measurement signal, the discontinuities are a first pair of discontinuities, the strain signal portion is a first strain signal portion, and further comprising:

determining a second portion of an additional signal by identifying a second strain signal portion between a second pair of discontinuities in the additional signal corresponding to additional chamber valve actuation points for one of an additional discharge valve or an additional suction valve in an additional chamber of the pump; and generating the pressure reading by:
      averaging the first portion and the second portion to generate an average strain signal portion; and
      correlating the average strain signal portion with the predetermined value representing the internal pressure in the chamber.

* * * * *